United States Patent [19]

Uehara

[11] 4,189,079
[45] Feb. 19, 1980

[54] CONTROLLABLE DRIVE FOR TAPE RECORDER

[75] Inventor: Zenshiro Uehara, Tokyo, Japan

[73] Assignee: Tokyo Rokuon Kogyo Kabushiki Kaisha, Tokyo, Japan

[21] Appl. No.: 913,513

[22] Filed: Jun. 7, 1978

[30] Foreign Application Priority Data

Oct. 31, 1977 [JP] Japan .................. 52-129641

[51] Int. Cl.² .............................................. B65H 17/22
[52] U.S. Cl. ............................... 226/188; 242/209
[58] Field of Search .............. 226/178, 188, 24, 33; 360/73, 74; 242/186, 206, 208–210, 190, 191

[56] References Cited

U.S. PATENT DOCUMENTS

| 3,507,435 | 4/1970 | Hathaway | 226/178 |
| 3,684,147 | 8/1972 | Ysbrand | 226/178 |
| 3,770,176 | 11/1973 | Hanzawa et al. | 226/176 |
| 3,971,528 | 7/1976 | Komatsu et al. | 242/191 |
| 4,123,015 | 10/1978 | Komatsu et al. | 242/191 |

Primary Examiner—Leonard D. Christian

[57] ABSTRACT

A controllable drive mechanism for tape recorders which utilizes the rotating motion of a flywheel for effecting movement of the various parts of the tape recorder selecting the various operating modes of the tape recorder. The mechanism includes a gear disposed for integral rotation with the flywheel, toothed sectional wheel which meshes with the gear, a cam rotated by the toothed wheel, and a link driven for angular movement by the cam.

4 Claims, 8 Drawing Figures

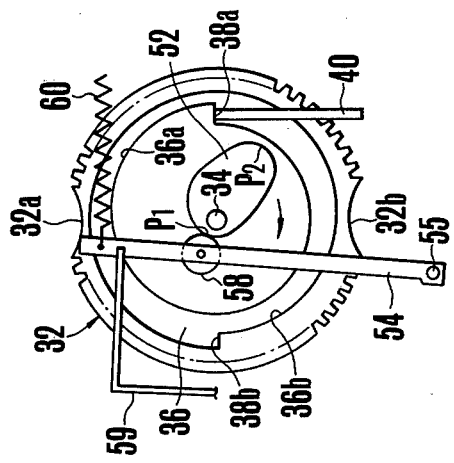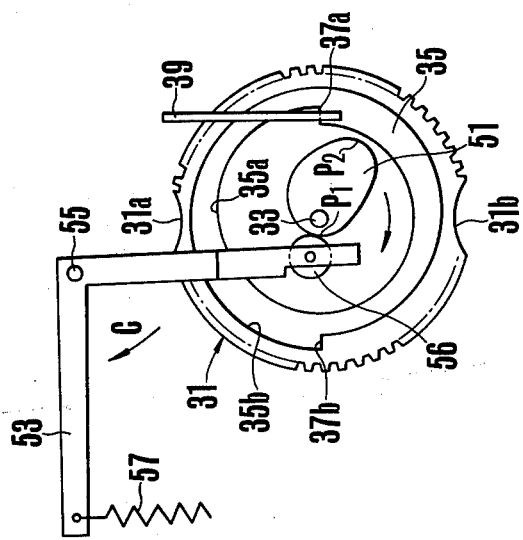

CONTROLLABLE DRIVE FOR TAPE RECORDER

BACKGROUND OF THE INVENTION

The invention relates to a controllable drive for tape recorder which utilizes the rotating motion of a flywheel associated with the capstan to enable a record, playback, rewind and other operation.

In the prior art practice, when a tape recorder of a cassette type or open reel type is to be constructed for automation of a record, playback, stop, rewind or other operation, an electromagnetic plunger is used as a drive source to permit a "feather-touch" operation or a remote control. When a record/playback mode of the tape recorder is to be established, it is necessary to slide a head mount on which various heads, pinch roller and the like are mounted, to a record/playback position against the action of a return spring or the like and to urge the pinch roller against the capstan with a force of a magnitude which is usually on the order of 1 to 2 kg. While the magnitude of the force varies with the variety and the size of the tape recorders, a required minimum value for apparatus of a reduced size will be on the order of 1 kg. The electromagnetic plunger which is used to produce such force will be oversized as compared with that of the heads, occupying a greater proportion of the space on the chassis. In addition, the power dissipation is increased, which is disadvantageous from the standpoint of minimizing the overall power consumption. In addition, the use of the electromagnetic plunger causes impacts and noises when it is energized, further contributing to the generation of heat. The situation is not limited to the operation of the plunger which is used to establish a record/playback mode, but the same applies to the operation of another electromagnetic plunger which is used to establish a rewind or rapid advance mode.

SUMMARY OF THE INVENTION

In view of these considerations, it is an object of the invention to provide a controllable drive for tape recorder which utilizes the rotating motion of a flywheel associated with a capstan by converting it into a form of motion which is necessary to establish a record/playback or rewind mode, thus dispensing with the electromagnetic plungers and minimizing the power dissipation and the overall size of the tape recorder.

In accordance with the invention, the controllable drive for tape recorder comprises a gear disposed for integral rotation with the flywheel, toothed wheel with hiatus which meshes with the gear, a cam driven for rotation by the toothed wheel, and a link driven for angular movement by the cam.

BRIEF DESCRIPTION OF THE DRAWINGS

FIG. 4 is a plan view of the toothed wheel with hiatus which is used to establish the record/playback mode according to the invention;

FIG. 5 is a similar plan view of the toothed wheel illustrating the operation thereof to establish a rewind mode;

DESCRIPTION OF PREFERRED EMBODIMENT

Figure 1:
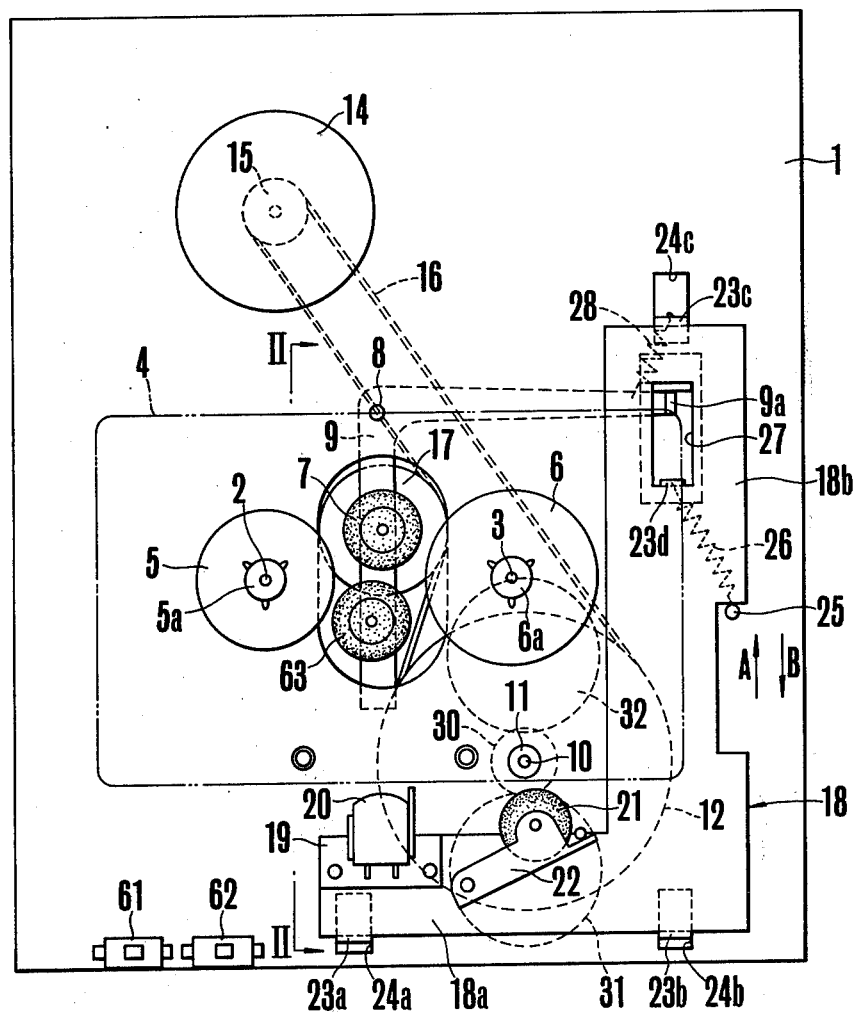
FIG. 1 is a plan view of the mechanical arrangement of a tape recorder incorporating the controllable drive of the invention.

FIG. 1 is a plan view of the mechanical arrangement of a tape recorder which incorporates the controllable drive of the invention. Mounted on a chassis 1 are a pair of shafts 2, 3 in an upright manner, which are spaced by a distance corresponding to the on-center spacing between a pair of reel hubs on which a cassette tape 4 is disposed. A feed reel mount 5 is rotatably mounted on the shaft 2 while a take-up reel mount 6 is rotatably mounted on the shaft 3. The respective reel mounts 5, 6 are integrally formed with concentric shanks 5a, 6a, which are engaged by the respective reel hubs.

A first idler 7 is disposed between the reel mounts 5, 6 for engagement with and disengagement from the outer periphery of the reel mount 6. The idler 7 is rotatably mounted on one end of an L-shaped lever 9 which is in turn pivotally mounted on the underside of the chassis 1 by means of pin 8. A second idler 63 is rotatably and pivotally mounted on the same end of the lever 9 for engagement with and disengagement from the outer periphery of the reel mount 5. The idler 63 is capable of bearing against the mount 5 and further bearing against the first idler 7 when the lever 9 rotates clockwise.

Figure 2:
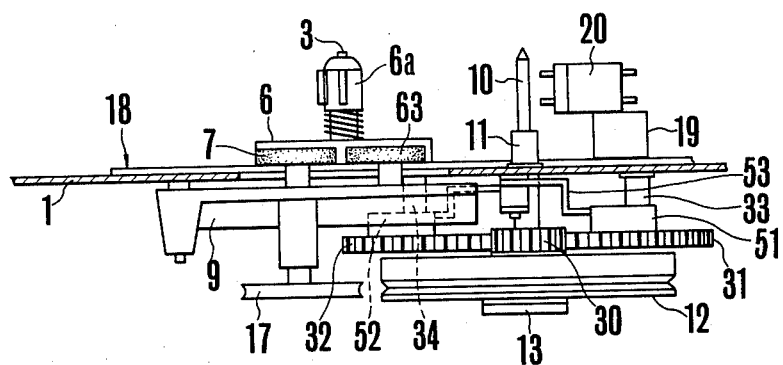
FIG. 2 is a side elevation taken along the line II—II and as viewed in the direction of the arrows.

A capstan 10 extends uprightly through the chassis 1 and is rotatably mounted therein by means of a bearing 11, and fixedly mounted on the portion of the capstan which extends below the chassis 1 is a flywheel 12 which serves stabilizing the rotation of the capstan 10 by absorbing small speed fluctuations caused by a non-uniform rotation of a motor and a transmission mechanism. The lower end of the capstan 10 is supported by a bracket 13, which is mounted on the underside of the chassis 1, in order to prevent the capstan from being withdrawn from the bearing 11 (see FIG. 2). A drive motor 14 is mounted on the chassis 1 and has its shaft extending below the chassis and fixedly carrying a pulley 15 below the latter. A belt 16 extends around the pulley 15 and the flywheel 12, thus transmitting the rotation of the motor 14 to the capstan 10. Intermediate the pulley 15 and the flywheel 12, the belt 16 also extends around a pulley 17 which is integrally mounted on the shaft on which the first idler 7 is mounted, thus also transmitting the rotation of the motor 14 to the first idler 7.

A head mounting baseplate 18 is disposed on top of the chassis 1 and is movable in directions indicated by arrows A, B. As will be noted from FIG. 1, the baseplate 18 has an inverted L-shaped configuration and includes a front arm 18a on which a record/playback head 20 is mounted by using a head mount 19 and on which a pinch roller 21 formed by rubber is also mounted by using a support 22 in a manner to permit its cooperation with the capstan 10. The front edge of the arm 18a is formed with a pair of spaced claws 23a, 23b which are engaged with elongate slots 24a, 24b formed in the chassis 1. Similarly, a claw 23c is formed on the rear edge of a lateral arm 18b of the baseplate 18, and engages a similar elongate slot 24c formed in the chassis. In this manner, the entire baseplate 18 is slidable in directions indicated by arrows A, B. A stop 25 is provided on the chassis 1 to limit the extent of movement of the baseplate 18 in the direction of arrow B, and a tension spring 26 extends between the stop 25 and a claw 23d formed on the baseplate 18 beneath the chassis to urge the baseplate 18 in the direction of arrow B for automatic return of the head assembly to its reset position. The other end 9a of the lever 9 which is remote from the idlers 7, 63 is engaged with a slot 27 formed in the lateral arm 18b so that the lever 9 can be turned either forwardly or reversely around the pin 8 as the baseplate 18 moves in the directions of arrows A, B, thereby moving the first idler 7 into engagement with or disengagement from the outer periphery of the take-up reel mount 6. Another tension spring 28 extends between the end 9a of the lever 9 and the claw 23c of the baseplate 18.

Figure 3:
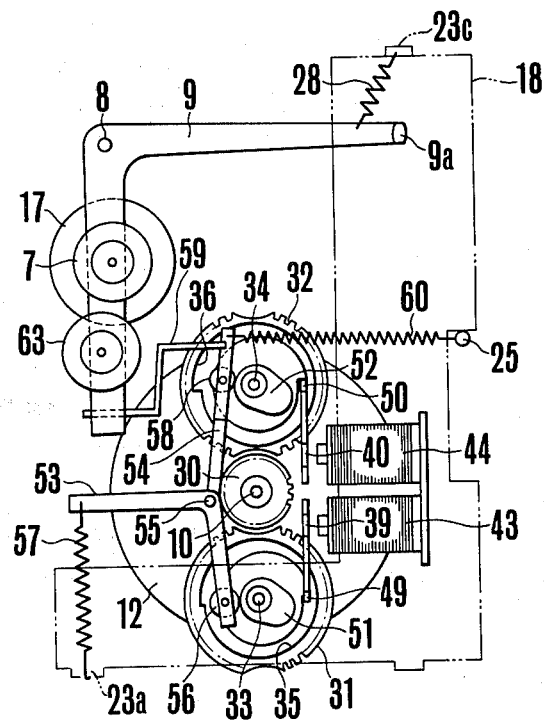
FIG. 3 is a plan view of the controllable drive of the invention, with the chassis and the head mounting plate removed.

FIG. 3 is a plan view of the controllable drive located below the chassis 1 and the baseplate 18, both of which are omitted from illustration. In this Figure, the drive comprises a gear 30 which is integral and concentric with the flywheel 12, and a toothed wheel 31 with hiatus and another toothed wheel 32 with hiatus, both of which are disposed for meshing engagement with the gear 30 at positions which are phase displaced 180° from each other. The respective hiatus wheels 31, 32 are rotatably mounted on their associated shafts 33, 34 which are mounted on the underside of the chassis 1 and extending at right angles thereto. The hiatus wheel 31 is peripherally formed with a pair of hiatuses 31a, 31b which are spaced apart 180° along the circumference thereof as shown in FIG. 4, and the hiatus wheel 32 is also peripherally formed with a pair of hiatuses 32a, 32b which are again displaced from each other by 180° as shown in FIG. 5. In the surface facing the chassis, the both hiatus wheels 31, 32 are formed with substantially concentric, continuous grooves 35, 36 respectively. A pair of locking steps 37a, 37b are formed on the inner and the outer wall surface 35a, 35b, respectively, of the groove 35 and are displaced 180° from each other and are displaced 90° from hiatuses 31a, 31b, as shown in FIG. 4. Similarly, as shown in FIG. 5, a pair of locking steps 38a, 38b are formed in the inner and the outer wall surface 36a, 36b of the groove 36, and are displaced 180° from each other and displaced 90° from the hiatuses 32a, 32b. The inner and outer wall surfaces of the respective grooves 35, 36 are in the form of an involute starting from the associated step.

Figure 6:
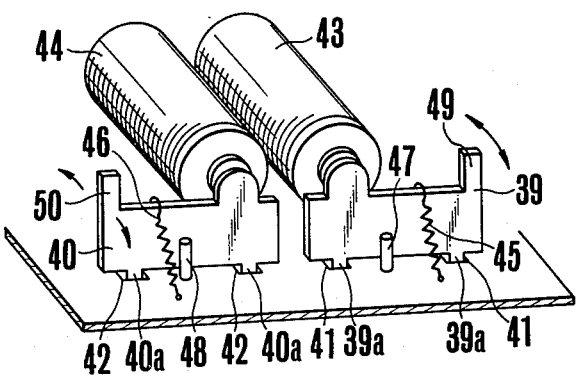
FIG. 6 is a perspective view of movable elements and electromagnets used in the invention.

A pair of movable elements 39, 40 in the form of plates are associated with the hiatus wheels 31, 32 respectively, and are disposed tangentially of the grooves 35, 36 of the associated wheels 31, 32. As shown in FIG. 6, along its edge which bears against the chassis, the movable element 39 is formed with a plurality of tabs 39a, which are engaged with apertures 41 formed in the chassis 1. Similarly, the movable element 40 is formed with a plurality of tabs 40a along the edge engaging the chassis, which tabs are engaged with apertures 42 formed in the chassis 1. In this manner, the movable elements 39, 40 are tiltable with respect to the chassis 1. A pair of electromagnets 43, 44 are mounted on the chassis 1 for attracting individual movable elements 39, 40. On the opposite sides from the electromagnets, a pair of springs 45, 46 are anchored to the chassis for urging the movable elements away from the associated electromagnets. A pair of stops 47, 48 are shown which limit the angle of inclination of the movable elements 39, 40 in a direction away from the corresponding electromagnets. In the region adjacent to the hiatus wheels, the movable elements 39, 40 are formed with projections 49, 50, respectively, which are disposed within the respective grooves 35, 36. When the elements are attracted by the associated electromagnets, the projections 49, 50 bear against the outer wall surfaces 35b, 36b of the grooves 35, 36, respectively, so as to be engaged by the steps 37b, 38b, respectively, while they are engaged by the steps 37a, 38a, respectively, when the elements 39, 40 are urged by the spring into abutment against the stops 47, 48 so as to bear against the inner wall surfaces 35a, 36a of the grooves 35, 36, respectively.

Integrally secured to the surface of the hiatus wheels 31, 32 in which the grooves are formed are, a pair of plate cams 51, 52 which are disposed in an offset manner and are associated with a pair of links 53, 54, separately, both of which are adapted to be angularly driven. The link 53 associated with the plate cam 51 is substantially L-shaped in configuration with the bend being pivotally mounted on the underside of the chassis 1 by means of a pin 55. A cam follower 56 is mounted on one end of the link 53 so as to be urged against the cam profile of the cam 51 by a tension spring 57 of a greater resilience than that of the baseplate return spring 26 and extending between the other end of the link 53 and the claw 23a on the baseplate 18. When the follower is held against the cam 51, the selection of a record/playback mode of the head assembly as well as its release operation can be achieved by the rotation of the plate disc 51. The link 54 associated with the other plate cam 52 is pivotally mounted on the same pin 55 as the link 53 at its one end, and fixedly carries a cam follower 58 which is urged against the cam profile of the plate cam 52 by a tension spring 60 extending between the other end of the link 54 and the stop 25 when the follower 58 is held against the cam 52, a tape rewind operation and its release operation can achieve through the rotation of the plate cam 52. At this end, the other end of the link 54 is connected with one end of the idler lever 9 by a rod 59 which is capable of functioning as a spring. A pair of switches 61, 52 (FIG. 1) operate to energize the electromagnets 43, 44, respectively.

The operation of the controllable drive according to the invention will be described below. Initially, it is assumed that a record/playback mode of the tape recorder is to be established under the conditions that the tape hubs carrying the cassette tape 4 are mounted on the reel mounts 5, 6 and the motor 14 is set in motion. When the head assembly including the head 20, pinch roller 21 and baseplate 18 assumes a non-play position shown in FIG. 1, the projection 49 on the movable element 39 is engaged with the inner step 37a formed in the groove 35 under the resilience of the spring 45 to thereby lock the hiatus wheel 31 (see FIG. 4) with its hiatus 31a located opposite to the gear 30, which is rotating integrally with the flywheel 12. In addition, the cam follower 56 engages the plate cam 51 at a position shown in FIG. 4 in which it has slightly moved past the short diameter apex $P_1$.

When the switch 61 is turned on under this condition, the electromagnet 43 is energized to attract the movable element 39 against the resilience of the spring 45. This disengages the projection 49 from the step 37a and brings it into engagement with the outer wall surface 35b. Simultaneously, the hiatus wheel 31 is unlocked, and the pressure exerted by the cam follower 56 which engages the cam at its apex $P_1$ causes the plate cam 51 and the hiatus wheel 31 to be slightly rotated in the direction indicated by an arrow in FIG. 4. This displaced the relative position of the hiatus 31a with respect to the gear 30, and the toothed portion of the wheel 31 is brought into meshing engagement with the gear 30. Thereupon the rotation of the gear 30 is transmitted to the wheel 31 and the plate cam 51, which therefore rotates in the direction of the arrow to cause the link 53 to rock in the direction of an arrow C about the pin 55 through the action of the cam follower 56. As a result, the base plate 18 slides in the direction of the arrow A shown in FIG. 1 against the resilience of the spring 26 by virtue of the rotating energy stored in the flywheel 12 and the drive from the motor 14. In this manner, the head 20 is brought into abutment against the cassette tape, and simultaneously the pinch roller 21 is brought into abutment against the capstan 10 under a given pressure, thus feeding the tape. As the baseplate 18 slides, the lever 9 connected therewith angularly moves counter-clockwise, as viewed in FIG. 1, under the resilience of the spring 28, bringing the first idler 7 into abutment against the take-up reel mount 6 to transmit its rotation thereto, thus causing the tape to be taken up on the corresponding reel hub as it is fed from the supply reel.

Figure 7:
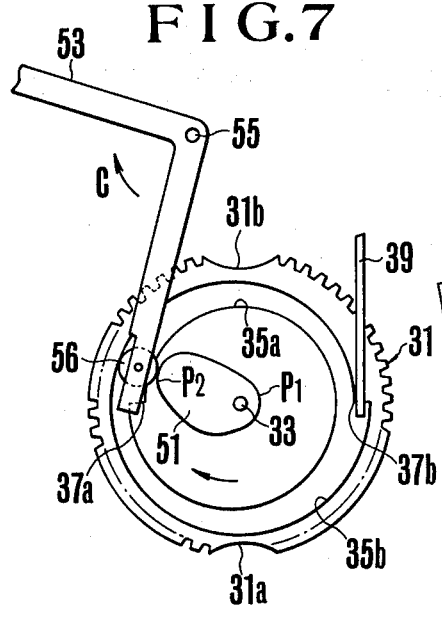
FIGS. 7 and 8 are plan views illustrating the operation of the invention.

On the other hand, when the head assembly assumes its record/playback position and the hiatus wheel 31 has rotated through 180° to place its hiatus 31b in opposing relationship with the gear 30, the projection 49 on the movable element 39 which has been held attracted by the electromagnet 43 will engage the outer step 37b, thus locking the hiatus wheel 31. At this time, the cam followers 56 engages the plate cam 51 at a position shown in FIG. 7 in which it has slightly moved past the greater diameter apex $P_2$.

The selected operation of the tape recorder can be released by turning off the switch 61, whereupon the electromagnet 43 is deenergized to disengage the projection 49 from the step 37b. Simultaneously, the pressure exerted by the cam follower 56 against the plate cam 51 causes it and hence the hiatus wheel 31 to rotate slightly in the direction of an arrow shown in FIG. 7, bringing the toothed portion of the wheel 31 into meshing engagement with the gear 30 which continues rotating. As the wheel 31 and the cam 51 rotate, the link 53 is caused to return from the position of FIG. 7 to that shown in FIG. 4 by the action of the cam follower 56, and simultaneously the baseplate 18 slides in the direction of the arrow B shown in FIG. 1, eventually returning to the condition shown in FIG. 1. At this time, the projection 49 on the movable element 39 again engages the inner step 37a of the groove 35, thus locking the hiatus wheel 31.

Considering a tape rewind operation of the tape recorder, the switch 62 may be turned on to energize the electromagnet 44. Thereupon, the movable element 40 is attracted against the resilience of the spring 46, with its projection 50 disengaged from the inner step 38a, unlocking the hiatus wheel 32. Simultaneously, since the cam follower 58 engages the cam 52 at a position shown in FIG. 5 in which it has slightly moved past the short diameter apex $P_1$ thereof to exert the pressure thereon, the plate cam 52 and the hiatus wheel 32 caused to rotate slightly in the direction of an arrow shown in FIG. 5, generally in the similar manner as when establishing the playback and/or record mode. In this manner, the wheel 32 is brought into meshing engagement with the rotating gear 30. The resulting rotation of the hiatus wheel 32 causes the plate cam 52 to rotate in the direction of the arrow shown in FIG. 5, causing the link 54 to move counter-clockwise, as viewed in FIG. 3, whereby the lever 9 which is connected therewith through the rod 59 moves clockwise, as viewed in FIG. 3, bringing the second idler 63 into abutment against both the feed reel mount 5 and the first idler 7. The rotation of the first idler 7 is thereby transmitted through the second idler 63 to the feed reel mount 5, achieving a rewind of the tape from the reel hub which is disposed on the take-up reel mount.

When the tape rewind mode is established, as the hiatus wheel 32 rotates through 180° to place the hiatus 32b in opposing relationship with the gear 30, the projection 50 on the movable element 40 which has been held attracted to the electromagnet 44 engages the outer step 38b, locking the hiatus wheel 32.

Figure 8:
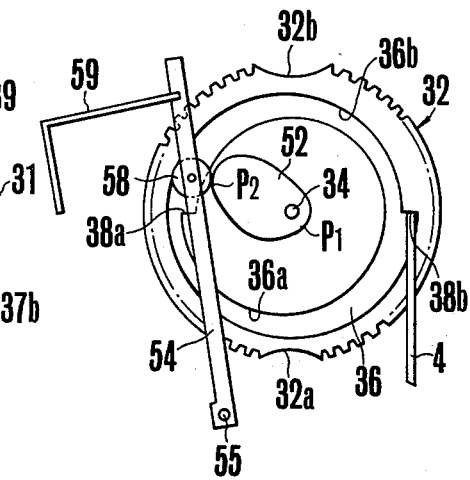

The tape rewind mode can be released by turning the switch 62 off. Thereupon, the electromagnet 44 is deenergized to disengage the projection 50 from the step 38b, and the pressure exerted upon the cam by the cam follower 58 which engages the latter at the greater diameter apex $P_2$ shown in FIG. 8 causes the plate cam 52 and the hiatus wheel 32 to rotate slightly in the direction of an arrow shown in FIG. 8, bringing the toothed portion of the wheel 32 into meshing engagment with the rotating gear 30. This permits the wheel 32 and the cam 52 to continue through a further 180°, returning the link 54 from the position of FIG. 8 to the position of FIG. 5 and simultaneously returning the lever 9 to its original position. The projection 50 on the movable element now engages the inner step 38a of the groove 36, thus locking the hiatus wheel 32.

It should be understood that the controllable drive of the invention is not limited in its application to the record/playback and rewind operation of the tape recorder, but it also applicable to a rapid tape advance operation. In this instance, another set of hiatus wheel, plate cam, movable element and electromagnet may be provided in the similar manner as mentioned above in connection with the record/playback operation. It is also possible to utilize a mechanical operation rather than the use of the electromagnet to operate the movable element in order to lock, unlock and position the hiatus wheel. Additionally, the hiatus wheel can be locked by other means than the step, such as pin or similar means.

What is claimed is:

1. A controllable drive for tape recorder comprising a capstan rotatably mounted on a chassis, a flywheel mounted on and in concentric relationship with the capstan, a gear integrally connected with the flywheel in concentric relationship therewith, a toothed wheel with hiatus which is rotatably mounted on the chassis and disposed for meshing engagement with the gear, a cam integral with the hiatus wheel, a link disposed for angular movement on the chassis to be angularly driven by the cam for producing a force which is necessary to operate the tape recorder, a movable element mounted on the chassis so as to be engageable and disengageable from the hiatus wheel and operative to lock the hiatus wheel when a hiatus thereof is located in opposing relationship with the gear, and means for operating the movable element.

2. A controllable drive according to claim 1 in which the link carries a cam follower which is maintained in abutment against the cam, a pressure exerted by the cam follower upon the cam being effective, when the movable element has unlocked the hiatus wheel, to cause a slight rotation of the cam and the hiatus wheel to bring a toothed portion of the wheel into meshing engagement with the gear.

3. A controllable drive according to claim 1 in which said means for operating the movable element comprises an electromagnet.

4. A controllable drive according to claim 1 in which the hiatus wheel includes a locking step and is locked by engaging the movable element with a detent means such as said step formed in the hiatus wheel.

* * * * *

REEXAMINATION CERTIFICATE (516th)

United States Patent [19]
Uehara

[11] B1 4,189,079
[45] Certificate Issued Jun. 10, 1986

[54] CONTROLLABLE DRIVE FOR TAPE RECORDER

[75] Inventor: Zenshiro Uehara, Tokyo, Japan

[73] Assignee: Hashimoto Corp., Tokyo, Japan

Reexamination Request:
No. 90/000,661, Nov. 5, 1984

Reexamination Certificate for:
Patent No.: 4,189,079
Issued: Feb. 19, 1980
Appl. No.: 913,513
Filed: Jun. 7, 1978

[30] Foreign Application Priority Data

Oct. 31, 1977 [JP] Japan ............................ 52-129641

[51] Int. Cl.⁴ .................................... B65H 17/22
[52] U.S. Cl. ...................... 226/188; 242/209
[58] Field of Search ............... 360/74.1, 74.2, 74.3, 360/74.4, 74.5, 74.6, 74.7, 96.2, 73; 242/186, 206, 208–210, 190, 191; 226/178, 188, 33, 24

[56] References Cited

U.S. PATENT DOCUMENTS

| | | | |
|---|---|---|---|
| 3,507,435 | 4/1970 | Hathaway | 226/178 |
| 3,684,147 | 8/1972 | Ysbrand et al. | 226/178 |
| 3,770,176 | 11/1973 | Hanzawa et al. | 226/176 |
| 3,971,528 | 7/1976 | Komatsu et al. | 242/191 |
| 3,976,263 | 8/1976 | Suzuki | 242/209 X |
| 4,101,941 | 7/1978 | Tanaka | 360/74.1 |
| 4,123,015 | 10/1978 | Komatsu et al. | 242/191 |

FOREIGN PATENT DOCUMENTS

48-20509 3/1973 Japan .
50-18013 2/1975 Japan .

*Primary Examiner*—Harvey C. Hornsby

[57] ABSTRACT

A controllable drive mechanism for tape recorders which utilizes the rotating motion of a flywheel for effecting movement of the various parts of the tape recorder selecting the various operating modes of the tape recorder. The mechanism includes a gear disposed for internal rotation with the flywheel, toothed sectional wheel which meshes with the gear, a cam rotated by the toothed wheel, and a link driven for angular movement by the cam.

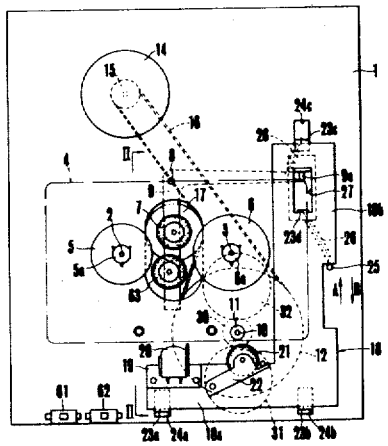

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-4 are cancelled.

* * * * *

REEXAMINATION CERTIFICATE (788th)
United States Patent [19]

Uehara

[11] B1 4,189,079
[45] Certificate Issued  Dec. 8, 1987

[54] CONTROLLABLE DRIVE FOR TAPE RECORDER

[75] Inventor: Zenshiro Uehara, Tokyo, Japan

[73] Assignee: Tokyo Rokuon Kogyo Kabushiki Kaisha, Tokyo, Japan

Reexamination Request:
No. 90/000,661, Nov. 5, 1984

Reexamination Certificate for:
Patent No.: 4,189,079
Issued: Feb. 19, 1980
Appl. No.: 913,513
Filed: Jun. 7, 1978

[30] Foreign Application Priority Data

Oct. 31, 1977 [JP] Japan .................. 52-129641

[51] Int. Cl.⁴ .......................... B65H 17/22
[52] U.S. Cl. ....................... 226/188; 242/209
[58] Field of Search ............ 360/74.1–74.7, 360/96.2, 73; 242/186, 190, 191, 206, 208–210; 226/178, 188, 33, 24

[56] References Cited

U.S. PATENT DOCUMENTS

| | | | |
|---|---|---|---|
| 3,507,435 | 4/1970 | Hathaway | 226/178 |
| 3,684,147 | 8/1972 | Ysbrand et al. | 226/178 |
| 3,770,176 | 11/1973 | Hanzawa et al. | 226/176 |
| 3,971,528 | 7/1976 | Komatsu et al. | 242/191 |
| 3,976,263 | 8/1976 | Suzuki | 242/209 X |
| 4,101,941 | 7/1978 | Tanaka | 360/74.1 |
| 4,123,015 | 10/1978 | Komatsu et al. | 242/191 |

FOREIGN PATENT DOCUMENTS 48-20509 3/1973 Japan.
50-18013 2/1975 Japan.

Primary Examiner—Harvey C. Hornsby

[57] ABSTRACT

A controllable drive mechanism for tape recorders which utilizes the rotating motion of a flywheel for effecting movement of the various parts of the tape recorder selecting the various operating modes of the tape recorder. The mechanism includes a gear disposed for integral rotation with the flywheel, toothed sectional wheel which meshes with the gear, a cam rotated by the toothed wheel, and a link driven for angular movement by the cam.

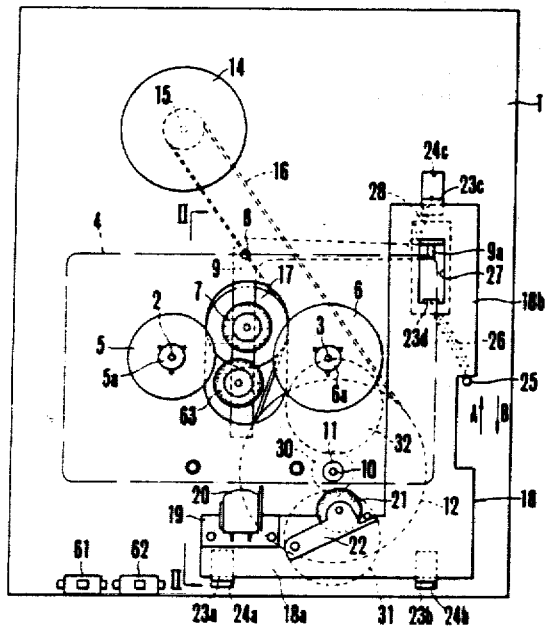

B1 4,189,079

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4 are cancelled.

New claims 5–7 are added and determined to be patentable.

5. *A controllable drive for a tape recorder comprising:*
*a tape drive capstan rotatably mounted on a chassis;*
*a flywheel, coaxial with said capstan for receiving rotational force from a motor of said tape recorder;*
*a drive gear fixed on said flywheel and coaxial therewith;*
*a hiatus wheel which is rotatably mounted on said chassis to mesh with said drive gear and which has two hiatuses spaced apart by an angular interval of substantially a hundred and eighty degrees from each other, said drive gear meshing with said hiatus wheel except when in opposition to one of said two hiatusus;*
*a plate cam mounted on a central portion of said hiatus wheel, said plate cam having greater and shorter diameter apexes;*
*a link rotatably mounted on said chassis, said link having a cam follower at one end which engages with a cam surface of said plate cam and another end which operates said tape recorder to place said tape recorder in an operating mode when said cam follower passes slightly beyond said greater diameter apex and in a reset mode when said cam follower passes slightly beyond said shorter diameter apex;*
*a spring for biasing said link such said cam follower abuts against said cam surface of said plate cam;*
*an endless circular groove formed in the plane of said hiatus wheel, said endless circular groove having inner and outer side surfaces;*
*a movable element;*
*a projection provided on said movable element which engages with said endless circular groove;*
*two step portions formed to be spaced apart by an angular interval of substantially one hundred and eighty degrees at said inner and outer side surfaces of said endless groove which are engagable with said projection of said movable element so as to align said drive gear to oppose said two hiatuses of said hiatus wheel to place said cam follower slightly beyond the greater and shorter diameter apexes of said hiatus wheel;*
*an electromagnet which upon energization moves said movable element such that said movable element disengages with a corresponding one of said two step portions of said endless circular groove; and*
*switching means for energizing said electromagnet;*
*whereby when said electromagnet is energized, said projection of said movable element is disengaged with said corresponding one of said two step portions of said endless groove of said hiatus wheel, said hiatus wheel rotates to a position where said cam follower slightly passes beyond said greater diameter apex of said plate cam, said projection engages with the other of said two step portions and said tape recorder is held in an operative mode through said link; and whereby when said electromagnet is deenergized, said projection disengages from said other of said two step portions and said hiatus wheel thereafter rotates until said projection is engaged with said corresponding one of said two step portions, said cam follower is aligned in position where said cam follower slightly passes beyond said shorter diameter apex of said plate cam, and said tape recorder is held in a reset mode by means of said link.*

6. *A controllable drive according to claim 5, in which when said electromagnet is deenergized to disengage said projection from said other of said two step portions, said hiatus wheel is rotated by a biasing force of said spring for biasing said cam follower to bring said cam follower into engagement with said cam surface of said plate cam and by inertia force of said flywheel, so that said tape recorder is held in a reset mode by means of engagement of said projection and said corresponding one of said two step portions when said electromagnet and said motor are deenergized.*

7. *A controllable drive according to claim 5 or 6, further comprising:*
*at least another hiatus wheel, said another hiatus wheel having at least another plate cam provided thereon and corresponding to at least another two step portions and at least another endless groove for said another hiatus wheel mounted in a planet configuration around said drive gear, said another hiatus wheel, another plate cam, another two step portions and another endless groove being of substantially the same construction as said hiatus wheel, plate cam, two step portions and endless groove, respectively;*
*at least another link having at least another cam follower which is brought into engagement with said another plate cam of said another hiatus wheel;*
*at least another movable element having a projection which is selectively engaged with said another two step portions of said another endless groove provided in said another hiatus wheel; and*
*at least another electromagnet for respectively moving said another movable element to thereby operate said tape recorder by means of said another link.*

* * * * *